United States Patent
Park et al.

(10) Patent No.: US 10,250,736 B2
(45) Date of Patent: Apr. 2, 2019

(54) TERMINAL CONTROLLING DEVICE AND CONTROLLING METHOD USING SAME

(71) Applicant: MODA-INNOCHIPS CO., LTD., Ansan-Si, Gyeonggi-Do (KR)

(72) Inventors: Sung Cheol Park, Ansan-si (KR); In Seob Jung, Ansan-si (KR)

(73) Assignee: MODA-INNOCHIPS CO., LTD. (KR)

( * ) Notice: Subject to any disclaimer, the term of this patent is extended or adjusted under 35 U.S.C. 154(b) by 55 days.

(21) Appl. No.: 15/529,988

(22) PCT Filed: Nov. 24, 2015

(86) PCT No.: PCT/KR2015/012646
§ 371 (c)(1),
(2) Date: May 25, 2017

(87) PCT Pub. No.: WO2016/085232
PCT Pub. Date: Jun. 2, 2016

(65) Prior Publication Data
US 2017/0353596 A1 Dec. 7, 2017

(30) Foreign Application Priority Data
Nov. 25, 2014 (KR) .......... 10-2014-0165163

(51) Int. Cl.
*G06F 3/041* (2006.01)
*G06F 3/0481* (2013.01)
(Continued)

(52) U.S. Cl.
CPC ........ *H04M 1/72569* (2013.01); *G06F 3/041* (2013.01); *G06F 3/0414* (2013.01);
(Continued)

(58) Field of Classification Search
None
See application file for complete search history.

(56) References Cited

U.S. PATENT DOCUMENTS

2008/0318616 A1* 12/2008 Chipalkatti ....... H04M 1/72572
455/550.1
2009/0256817 A1* 10/2009 Perlin ................... G06F 3/0233
345/174
(Continued)

FOREIGN PATENT DOCUMENTS

JP 2013042438 A 2/2013
JP 2013156683 A 8/2013
(Continued)

OTHER PUBLICATIONS

International Search Report for PCT/KR2015/012646 dated Feb. 18, 2016.
Written Opinion for PCT/KR2015/012646 dated Feb. 18, 2016.

*Primary Examiner* — David Bilodeau
(74) *Attorney, Agent, or Firm* — Renaissance IP Law Group LLP

(57) ABSTRACT

A terminal control device has a mode control module for switching an execution mode of a terminal. The terminal control device includes a main control module configured to control driving of the terminal, a receiver sensor installed in the terminal and configured to generate a voltage in response to an external force applied from the outside of the terminal, and a signal processing unit configured to analyze a voltage value generated in the receiver sensor, to process the voltage value into a signal for switching a mode of the terminal, and to transfer the mode switching signal to the main control module.

28 Claims, 9 Drawing Sheets

(51) Int. Cl.
*H04M 1/725* (2006.01)
*H04W 52/02* (2009.01)

(52) U.S. Cl.
CPC ... *H04M 1/72519* (2013.01); *H04M 1/72583* (2013.01); *H04W 52/0254* (2013.01); *G06F 3/04817* (2013.01); *G06F 2203/04105* (2013.01); *H04M 2201/38* (2013.01); *H04M 2201/42* (2013.01); *H04M 2250/12* (2013.01); *H04M 2250/22* (2013.01); *H04M 2250/52* (2013.01); *Y02D 70/00* (2018.01); *Y02D 70/1242* (2018.01)

(56) References Cited

U.S. PATENT DOCUMENTS

2011/0260994 A1* 10/2011 Saynac ............... G06F 3/0414
                                                    345/173
2012/0162114 A1*  6/2012 Inoue ................. G06F 3/016
                                                    345/173
2014/0232677 A1*  8/2014 Yamane .............. G06F 3/041
                                                    345/173

FOREIGN PATENT DOCUMENTS

| | | |
|---|---|---|
| JP | 2014010468 A | 1/2014 |
| JP | 2014531166 A | 11/2014 |
| KR | 20090071996 A | 7/2009 |
| KR | 20100123336 A | 11/2010 |
| KR | 20110026384 A | 3/2011 |
| KR | 20110055094 A | 5/2011 |
| KR | 20110113931 A | 10/2011 |
| KR | 20130064257 A | 6/2013 |
| WO | 2010013715 A1 | 2/2010 |
| WO | 2012108213 A1 | 8/2012 |
| WO | 2012114772 A1 | 8/2012 |
| WO | 2014073440 A1 | 5/2014 |

* cited by examiner

TERMINAL CONTROLLING DEVICE AND CONTROLLING METHOD USING SAME

TECHNICAL FIELD

The present invention relates to a terminal control device and a control method using the same, and more particularly, to a terminal control device for switching a mode of a terminal with ease and a control method using the same.

BACKGROUND ART

With the development of information and communications technology, semiconductor technology, and the like, mobile terminals have rapidly been popularized and are being widely used. The mobile terminals provide various functions such as a call function, a music playback function, a message transmission/reception function, a digital broadcast receiving function, an Internet access function, etc.

Meanwhile, batteries are used in mobile terminals for portability. Therefore, due to the usage of batteries, a method for reducing voltage consumption is an important issue in the field of mobile terminals. To reduce the voltage consumption, a mobile terminal is operated in a low-power mode, i.e., a sleep mode, when the mobile terminal is not used. When a wake-up signal is input to the mobile terminal operating in the sleep mode, the sleep mode is disabled, and the terminal is operated in an activation mode in which the terminal is activated.

To switch a terminal from the sleep mode to the wake-up mode or from the wake-up mode to the sleep mode, a key (or button), which is operated by a physically applied force, is provided to a body of the terminal, and the switching is performed in response to a user's operation of pressing the key.

However, in the case where the switching between the sleep mode and the wake-up mode is repeatedly performed by pressing a key exposed to the outside, a defect or failure of the key frequently occurs. Accordingly, recently considered is a method of switching a terminal to the sleep mode or the wake-up mode through a motion, a voice, or the like without physically applying pressure or a contact. However, in the case of such a non-contact method, incorrect operation frequently occurs due to external factors regardless of a user's intention.

DISCLOSURE OF THE INVENTION

Technical Problem

The present invention provides a terminal control device for switching a mode of a terminal with ease and a control method using the same.

Furthermore, the present invention provides a terminal control device for switching a mode of a terminal with ease by using an external force applied by a user to the terminal and a control method using the same.

Technical Solution

The present invention relates to a terminal control device having a mode control module for switching an execution mode of a terminal, the terminal control device including: a main control module configured to control driving of the terminal; a receiver sensor installed in the terminal and capable of inter-conversion between an electric signal and an external physical force; and a signal processing unit configured to analyze an electric signal generated in the receiver sensor, process the electric signal into a signal for switching a mode of the terminal, and transfer the mode switching signal to the main control module.

In the receiver sensor, a generated voltage value changes according to a magnitude of an external force applied to the receiver sensor, voltages are generated by as many as the number of times the external force is applied, and a plurality of voltage peaks occur at a time interval corresponding to an interval between application times of the external force applied multiple times.

The mode switching control unit analyzes voltage data generated from the receiver sensor to generate a plurality of mode switching signals for switching to different modes based on at least one of a voltage peak value, the number of voltage peaks, and an occurrence time interval between the voltage peaks.

The signal processing unit includes: a data collecting unit configured to collect a voltage value generated in the receiver sensor according to a time at which the external force is applied, and store the collected voltage data; a mode switching determination unit configured to compare a reference value and a receiver sensor voltage value stored in the data collecting unit to determine whether the external force was intentionally input by a user to switch the mode of the terminal; and a mode switching control unit configured to maintain a current mode of the terminal, or differently transfer, according to a type of a generated voltage, a mode switching signal to the main control module, according to a result of determination by the mode switching determination unit.

The reference value stored in the mode switching determination unit includes a first reference value and a second reference value larger than the first reference value, wherein, when the receiver sensor voltage value is equal to or larger than a first reference value and is equal to or smaller than the second reference value, the mode switching control unit switches the mode of the terminal to a mode different from a current mode, wherein, when the receiver sensor voltage value is smaller than a first reference value, the mode switching control unit maintains a current mode state of the terminal, wherein, when the receiver sensor voltage value exceeds a second reference value, the mode switching control unit switches the terminal to a security mode.

The security mode is any one of displaying a popup window showing a security or warning message, displaying a popup window showing a query about execution, and switching to a sleep mode.

A plurality of mode switching signals for switching to different modes are any one of switching the terminal from a sleep mode to a wake-up mode, signal reception mode switching for switching a signal reception type of the terminal to any one of a sound mode, a vibration mode, and a lamp mode, emergency call mode switching for performing an emergency call, camera mode switching for operating a camera installed in the terminal, and screen mode switching for switching screens for functions being executed and visually displayed on a display module of the terminal.

When the mode switching control unit switches the terminal by generating a corresponding signal according to the number of voltage peaks, when the number of the voltage peaks is one in a state in which the terminal is in a sleep mode, the mode switching control unit generates a first mode switching signal so that first mode switching is performed in the terminal, when the number of the voltage peaks is two in the state in which the terminal is in the sleep mode, the mode switching control unit generates a second mode switching signal so that second mode switching is performed in the terminal, and when the number of the voltage peaks is three in the state in which the terminal is in the sleep mode, the mode switching control unit generates a third mode switching signal so that third mode switching is performed in the terminal.

Each of the first to third mode switching is any one of switching to a wake-up mode, signal reception mode switching for switching a signal reception type of the terminal to any one of a sound mode, a vibration mode, and a lamp mode, and emergency call mode switching for performing an emergency call.

When the mode switching control unit switches the terminal by generating a corresponding signal according to the number of voltage peaks, when the number of the voltage peaks is one in a state in which the terminal is in a wake-up mode, the mode switching control unit generates a fourth mode switching signal so that fourth mode switching is performed in the terminal, and when the number of the voltage peaks is two in the state in which the terminal is in the wake-up mode, the mode switching control unit generates a fifth mode switching signal so that fifth mode switching is performed in the terminal.

The second mode switching signal and the fifth mode switching signal are generated when a second voltage peak occurs within a first reference time after occurrence of a first voltage peak, wherein the third mode switching signal is generated when the second voltage peak and a third voltage peak occur within a second reference time after the occurrence of the first voltage peak.

Each of the fourth mode switching and the fifth mode switching is either of signal reception mode switching for switching a signal reception type of the terminal to any one of a sound mode, a vibration mode, and a lamp mode and screen mode switching for switching screens for functions being executed and visually displayed on a display module of the terminal.

The receiver sensor acts as a speaker for transferring a call connection sound and a voice of a user's other party to the user in response to an input electric signal.

The receiver sensor includes a piezoelectric layer which is deformed by an external force input from the outside of the terminal so as to generate a voltage.

The receiver sensor is a piezoelectric bone conduction receiver including a piezoelectric layer capable of inter-conversion between an electric signal and an external physical force.

The display module of the terminal includes a display unit having a visual display effect and a window installed to cover the display unit, wherein the receiver sensor has a smaller area in comparison with the display module and the window so as to be correspondingly positioned at a back of the window.

The present invention relates to a terminal control method for switching an execution mode of a terminal, the terminal control method including: determining whether a signal for switching a terminal mode is applied to a receiver sensor installed in the terminal and capable of inter-conversion between an electric signal and an external physical force; and switching the terminal to a mode different from a currently running mode of the terminal or maintaining the currently running mode by using voltage data generated in response to an external force applied to the receiver sensor.

In the receiver sensor, a generated voltage value changes according to a magnitude of an external force applied to the receiver sensor, voltages are generated by as many as the number of times the external force is applied, and a plurality of voltage peaks occur at a time interval corresponding to an interval between application times of the external force applied multiple times.

Voltage data generated from the receiver sensor is analyzed to generate a plurality of mode switching signals for switching to different modes based on at least one of a voltage peak value, the number of voltage peaks, and an occurrence time interval between the voltage peaks.

The determining whether the signal for switching the terminal mode is applied to the receiver sensor includes: setting a first reference value having a first voltage value and a second reference value having a larger voltage value than that of the first reference value; detecting a voltage value generated from the receiver sensor; determining that the signal for switching the terminal mode is applied to the receiver sensor, when the detected voltage value of the receiver sensor satisfies a range of from the first reference value to a second reference value; maintaining the terminal in a current mode state when the voltage value of the receiver sensor is smaller than a first reference value in a state in which the terminal is currently in a sleep model; and switching, by the mode switching control unit, the terminal to a security mode when the voltage value of the receiver sensor exceeds a second reference value.

The security mode is any one of displaying, on a display unit of the terminal, a popup window showing a security or warning message, displaying a popup window showing a query about execution, and switching to a sleep mode.

A plurality of mode switching signals for switching to different modes are any one of switching the terminal from a sleep mode to a wake-up mode, signal reception mode switching for switching a signal reception type of the terminal to any one of a sound mode, a vibration mode, and a lamp mode, emergency call mode switching for performing an emergency call, camera mode switching for operating a camera installed in the terminal, and screen mode switching for switching screens for functions being executed and visually displayed on a display module of the terminal.

The determining that the signal for switching the terminal mode is applied to the receiver sensor, when the voltage value of the receiver sensor satisfies the range of from the first reference value to a second reference value, includes: determining whether the terminal is in a sleep mode or a wake-up mode; analyzing the voltage data generated in the receiver sensor to detect the number of voltage peaks that have occurred; and switching the terminal of the sleep mode or the wake-up mode to a mode different from a current mode, by generating mode switching signals for switching to different modes according to the number of the voltage peaks.

To detect the number of the voltage peaks, it is determined whether, after a first voltage peak, a next voltage peak occurs within a reference time, wherein, when the next voltage peak occurs within the reference time after the first voltage peak, a mode switching signal for switching to a mode different from that for occurrence of only the first voltage peak is generated so as to switch the terminal to a corresponding mode.

When switching the terminal to a corresponding mode according to the number of the voltage peaks, when the number of the voltage peaks is one in a state in which the terminal is in a sleep mode, a first mode switching signal is generated so that first mode switching is performed in the terminal, when the number of the voltage peaks is two in the state in which the terminal is in the sleep mode, a second mode switching signal is generated so that second mode switching is performed in the terminal, and when the number of the voltage peaks is three in the state in which the terminal is in the sleep mode, a third mode switching signal is generated so that third mode switching is performed in the terminal.

Each of the first to third mode switching is any one of switching to a wake-up mode, signal reception mode switching for switching a signal reception type of the terminal to any one of a sound mode, a vibration mode, and a lamp mode, and emergency call mode switching for performing an emergency call.

When switching the terminal to a corresponding mode according to the number of the voltage peaks, when the number of the voltage peaks is one in a state in which the terminal is in a wake-up mode, a fourth mode switching signal is generated so that fourth mode switching is performed in the terminal, and when the number of the voltage peaks is two, a fifth mode switching signal is generated so that fifth mode switching is performed in the terminal.

The second mode switching signal and the fifth mode switching signal are generated when a second voltage peak occurs within a first reference time after occurrence of a first voltage peak, wherein the third mode switching signal is generated when the second voltage peak and a third voltage peak occur within a second reference time after the occurrence of the first voltage peak.

Each of the fourth mode switching and the fifth mode switching is either of signal reception mode switching for switching a signal reception type of the terminal to any one of a sound mode, a vibration mode, and a lamp mode and screen mode switching for switching screens for functions being executed and visually displayed on a display module of the terminal.

The receiver sensor acts as a speaker for transferring a call connection sound and a voice of a user's other party to the user in response to an input electric signal.

Advantageous Effects

According to embodiments of the present invention, a user may easily switch a mode of a terminal by performing a simple operation of applying an external force, i.e., a knock, to a window of the terminal. Furthermore, by using a receiver sensor as a sensor for switching the mode of the terminal in response to an external force, the mode of the terminal may be switched more accurately in comparison with the prior art. Moreover, when the user unintentionally applies an external force, the terminal may be prevented from switching the mode or maintaining a turned-on state of the display module, and thus incorrect operation of the terminal may be reduced and personal information of the user may be protected.

MODE FOR CARRYING OUT THE INVENTION

Figure 1:
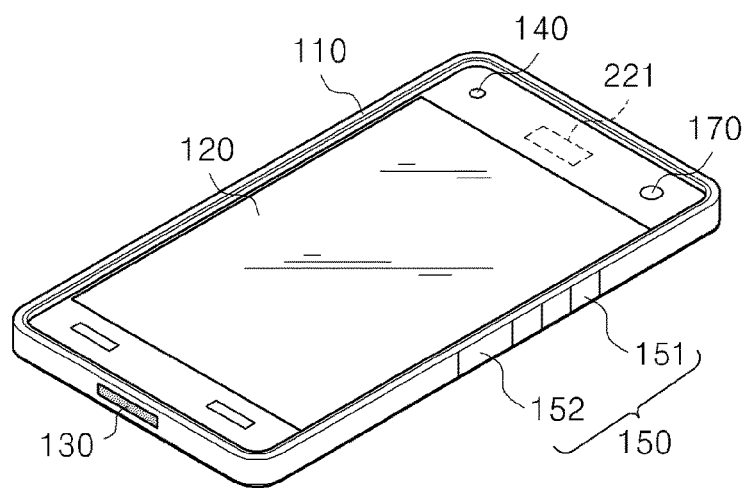
FIG. 1 is a top view illustrating an example of a terminal according to an embodiment of the present invention as seen from above the terminal.

Hereinafter, embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the same reference numerals refer to the same elements.

Figure 2:
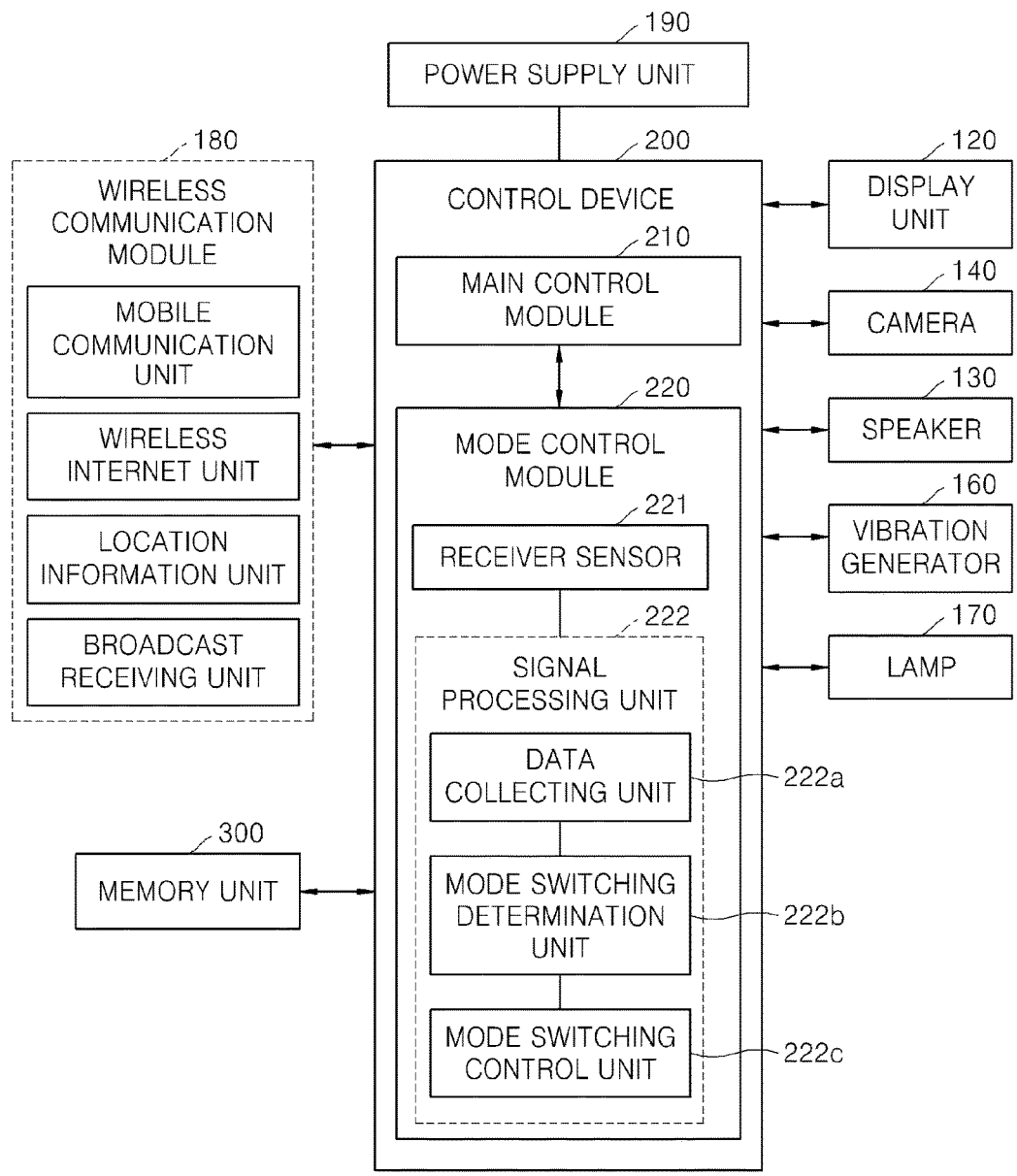
FIG. 2 is a block diagram illustrating a terminal according to an embodiment of the present invention.
Figure 3:
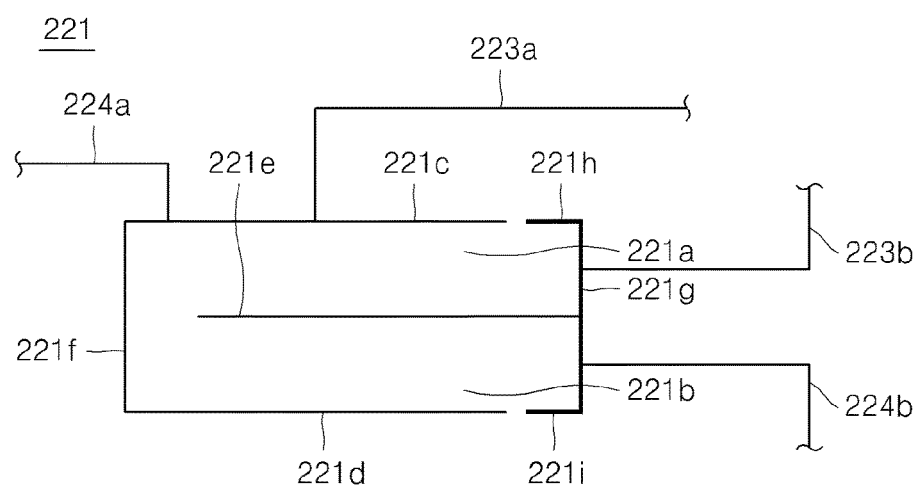
FIG. 3 is a diagram for describing a receiver sensor according to an embodiment of the present invention.

FIG. 1 is a top view illustrating an example of a terminal according to an embodiment of the present invention as seen from above the terminal. FIG. 2 is a block diagram illustrating a terminal according to an embodiment of the present invention. FIG. 3 is a diagram for describing a receiver sensor according to an embodiment of the present invention.

Figure 4:
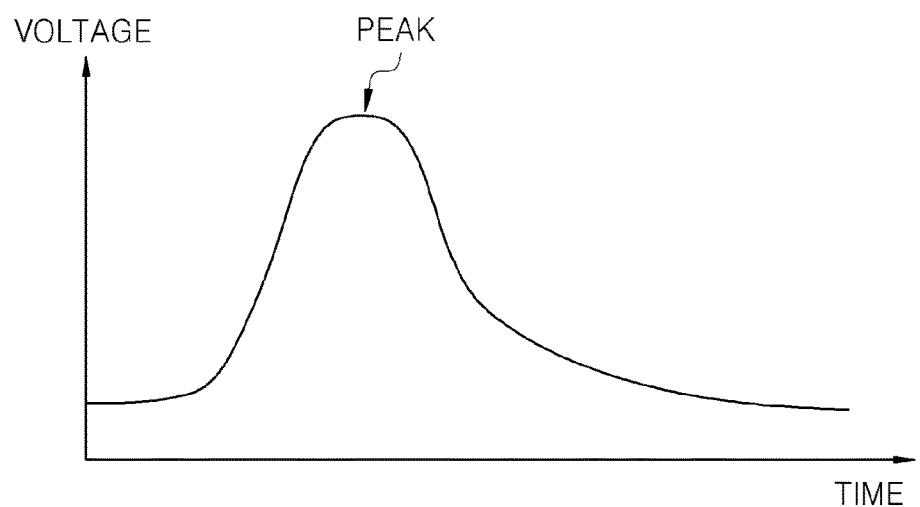
FIGS. 4 to 6 are graphs illustrating voltage values generated when an external force is applied to a receiver sensor according to an embodiment of the present invention.
Figure 5:
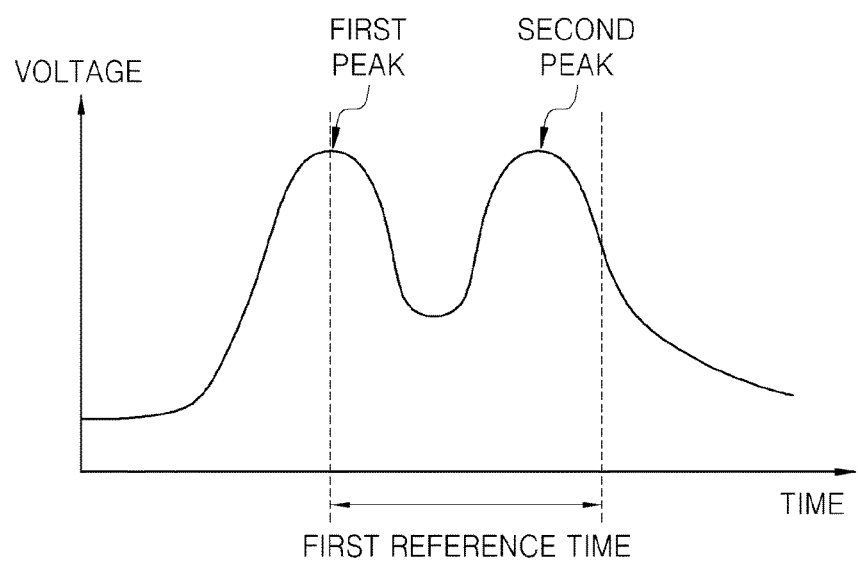
Figure 6:
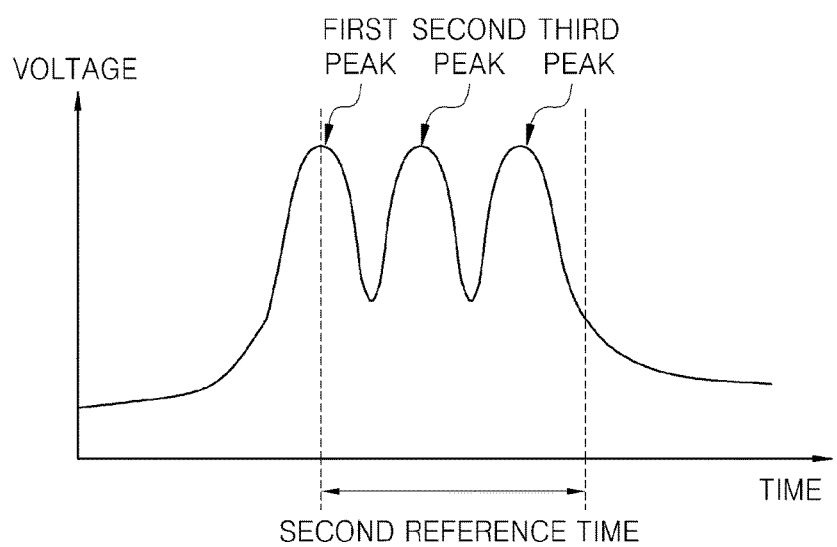
Figure 7:
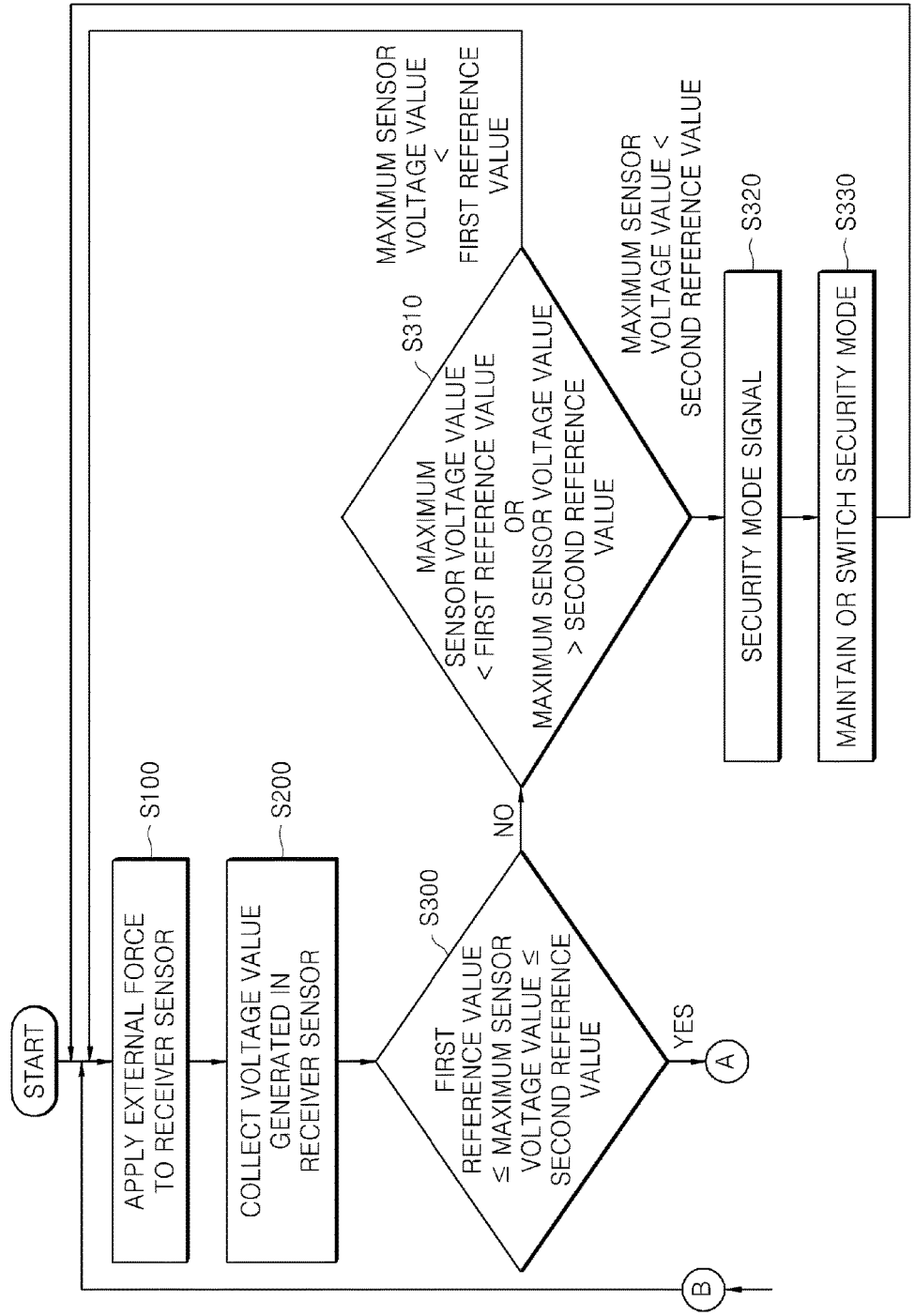
FIGS. 7 to 9 are flowcharts sequentially illustrating a mode switching method for a control device including a mode control module according to an embodiment of the present invention.
Figure 8:
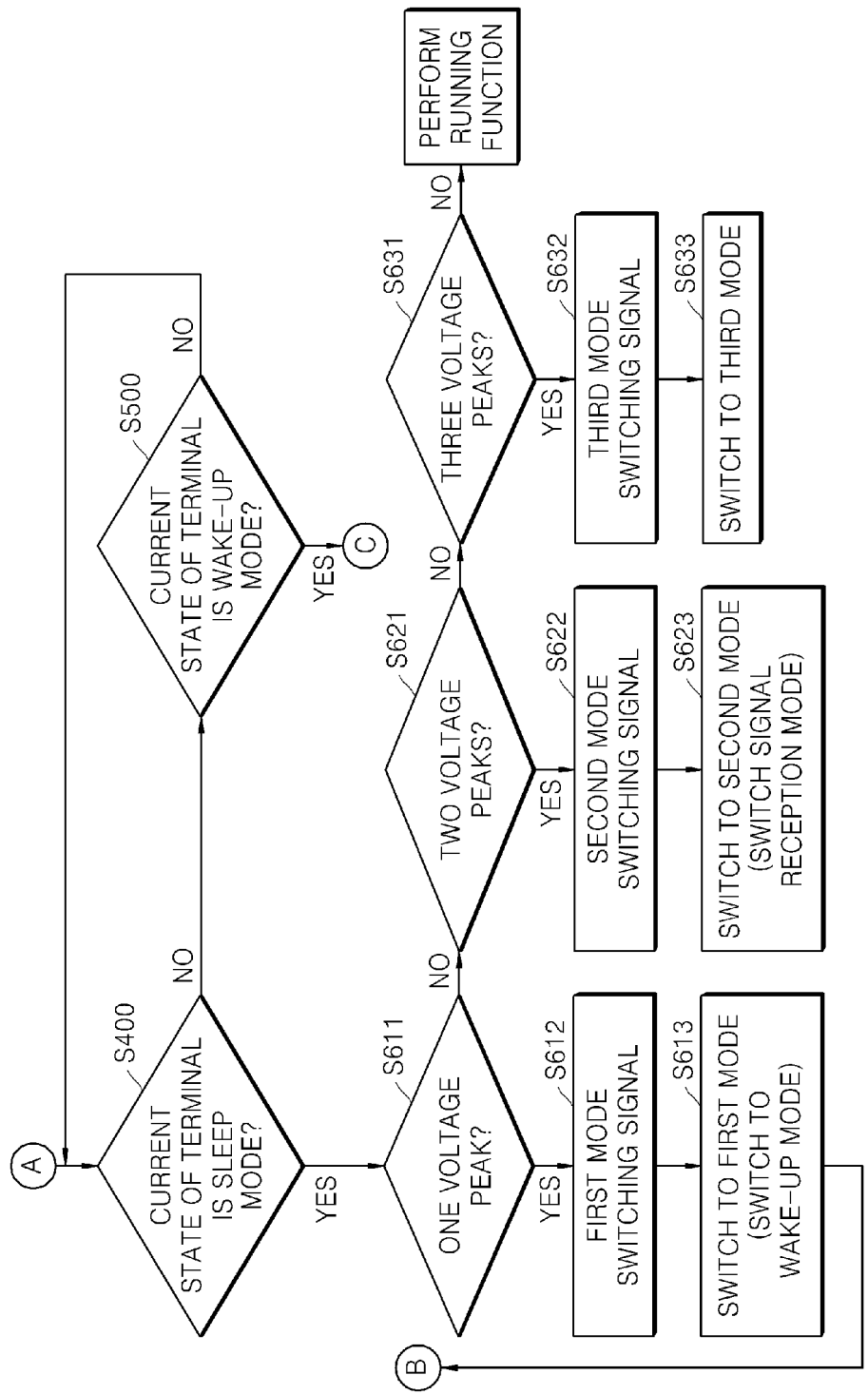
Figure 9:
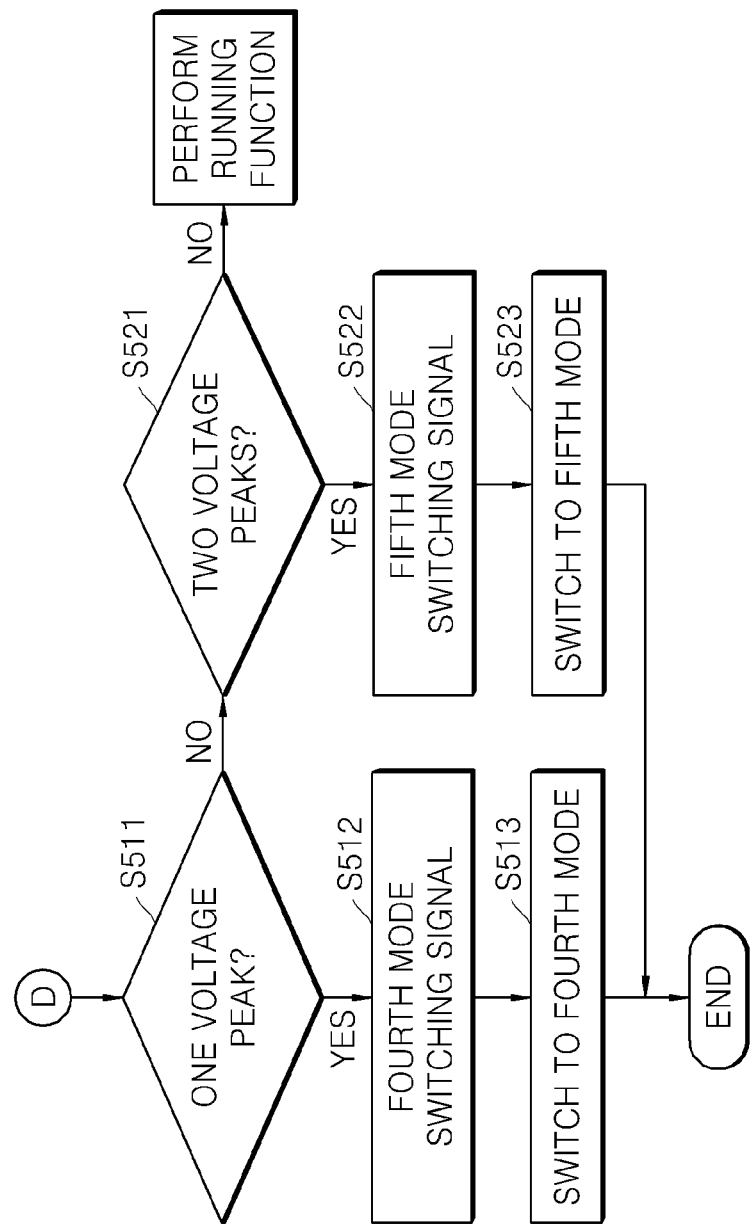

FIGS. 4 to 6 are graphs illustrating voltage data generated when an external force is applied to a receiver sensor according to an embodiment of the present invention. FIGS. 7 to 9 are flowcharts sequentially illustrating a mode switching method for a control device including a mode control module according to an embodiment of the present invention.

Before providing the detailed description, a terminal according to the present invention includes a mobile terminal and a fixed terminal. Here, the mobile terminal, which is a portable and easy-to-carry electronic device, may be a video phone, a cell phone, a smartphone, a WCDMA terminal, a universal mobile telecommunication service (UMTS) terminal, a personal digital assistant (PDA), a portable multimedia player (PMP), a digital multimedia broadcasting (DMB) terminal, an e-book, a portable computer such as a notebook or a tablet PC, a digital camera, or the like. The fixed terminal may be a desktop personal computer, or the like.

Hereinafter, a mobile terminal, more specifically, a smartphone is used as an example to describe a terminal according to an embodiment of the present invention.

Referring to FIGS. 1 and 2, a terminal according to an embodiment of the present invention includes a case 110 which forms an exterior of the terminal and has an inner space, a display module 120 installed on a front surface of the case 110, a camera 140, a user operation unit 150 provided to the case 110 so as to be operable by a user, a vibration generator 160 installed in the case 110 to generate a vibration in response to a received signal, and a lamp 170 which emits light. Furthermore, the terminal includes a speaker 130 installed on one of a side surface and a rear surface of the terminal to output a sound generated by the terminal, for example, a song, a call receiving sound, a notification sound, an alarm sound, etc., a wireless communication module 180 installed outside the case 110 or installed in the case 110 to enable wireless communication between the terminal and a wireless communication system or between the terminal and a network, and a control device 200 installed in the case 110 to control overall driving of the terminal. Furthermore, the terminal includes a memory unit 300 which stores data such as a program for operating the control device 200, input/output messages, images, videos, and the like, and a power supply unit 190 which receives external power and internal power by means of the control device 200 to supply power for operating each element.

The case 110, which is an element connected to the display module 120 to form the exterior of the terminal, is positioned under the display module 120 to support the display module 120. Furthermore, various electronic components of the terminal, such as the wireless communication module 180 and the control device 200 for controlling overall driving of the terminal, are embedded in a space between the case 110 and the display module 120.

The speaker 130 for outputting a sound (or audio), a microphone for receiving a sound, and the user operation unit 150 for controlling operation of the terminal are installed on an outer circumferential surface of the case 110. Furthermore, an antenna for a phone call and an antenna for receiving a broadcast may be installed at the case 110. Here, the antennas may be installed in the case 110 or may be installed so as to be withdrawable out of the case 110.

The speaker 130 outputs a sound generated in the terminal, for example, a sound for notifying reception of a call, a message, or the like, a notification sound for other additional functions, and audio data according to audio and image files stored in the memory unit 300.

The microphone collects a voice of the user or other audio signals during a telephone conversation.

The user operation unit 150 is provided so as to be operable by the user to receive a command for controlling the operation of the terminal. The user operation unit 150 may include a plurality of operation units, for example, second and third operation units provided to the case 110 so as to be positioned at a side of the display module 120 to perform functions of a sound operation button and a port for connecting various external terminals.

The display module 120 includes a display unit which visually displays various types of information such as characters, numbers, signs, graphics, images, pictures, or icons, and a window which is correspondingly installed on the case 110 to cover the display unit.

The display unit may be a liquid crystal display (LCD), an organic light-emitting diode (OLED), a flexible display, a three-dimensional display, or the like. This display unit may be operated so that a screen of the display unit is operated as a whole or the screen is divided into a plurality of areas. Here, in the latter case, the plurality of areas may be operated in association with each other.

The window covers the display unit correspondingly installed on the case 110, and is a light transmissive material such as glass. The display unit is installed under the window. Here, the window and the case 110 according to an embodiment are provided so as to have larger areas in comparison with the display unit. That is, the display unit is provided so as to have a smaller area in comparison with the window and the case 110, and is positioned between the window and the case 110. Therefore, the window also covers an outer side of the display unit to cover an upper side of the display unit. Furthermore, a capacitive touch sensor driven by means of static electricity of the user or a resistive touch sensor driven by means of a user's pressing force is mounted on an area of the window which corresponds to the display unit. Accordingly, when the user touches the window, a signal of the capacitive touch sensor or the resistive touch sensor is transmitted to the control device, and a corresponding function is performed by the control device 200. For example, the control device 200 is driven to analyze and determine which area of the display module 120 has been touched to perform a function corresponding to the area.

Furthermore, the camera 140 and the lamp 170 for generating light may be installed on an area of the window which does not correspond to the display unit, in other words, an outer area of the display unit.

The camera 140, which is a device for capturing an image of a subject, may convert the subject into an electric image signal. The camera 140 according to an embodiment may be a complementary metal oxide semiconductor (CMOS)-type or charge coupled device (CCD)-type camera. Since such cameras would be obvious to those skilled in the art, detailed descriptions of such cameras are omitted. In particular, the camera according to the present invention may be connected to a main control module of the control device.

The wireless communication module 180 may include at least one module that enables communication between the terminal and a wireless communication system or between the terminal and a network where the terminal is located. For example, the wireless communication module 180 may include a broadcast receiving unit, a mobile communication unit, a wireless Internet unit, a location information unit, and the like.

The memory unit 300 may store a program for operating the control unit 200 and may store input/output data. In detail, the memory unit 300 may store various programs for operating various applications such as a clock, music playback, a game, terminal setting, SNS, etc., a broadcast signal and/or broadcast-related information received through the broadcast receiving unit, image data processed in the camera, and various sounds such as The memory unit 300 may include at least one type of storage media among a flash memory type, a hard disk type, a multimedia card micro type, a card-type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Hereinafter, a configuration of the control device 200 according to an embodiment of the present invention will be described with reference to FIG. 2.

Referring to FIG. 2, the control device 200 according to the present invention includes a main control module 210 for controlling overall operation of the terminal and a mode control module 220 which is provided with a receiver sensor 221 operated by an external force and switches a mode of the terminal in response to a signal output due to operation of the receiver sensor 221.

The main control module 210 controls the overall operation of the terminal. For example, the main control module 210 performs control and processing related to a voice call, data communication, a video call, a sound output, an image output, vibration generation, and light generation. Furthermore, the control device 200 may perform a pattern recognition process for recognizing characters or images from a handwriting input or a picture drawing input performed on the display module 120. That is, the control device 200 interworks with the display module 120, the camera 140, the speaker 130, the vibration generator 160, the lamp 170, the wireless communication module 180, the memory unit 300, and the power supply unit 190 described above, so as to control the foregoing elements so that functions thereof may be performed in the terminal. The control device 200 may be configured as a circuit board installed in the case 110, as a hardware example. That is, the camera 140 is connected to the circuit board so that a captured image is controlled by the circuit board so as to be displayed through the display module 120. Furthermore, the speaker 130 is connected to the circuit board so that various images, audios, notification sounds, and the like are controlled by the circuit board so as to be output through the speaker 130. Moreover, the vibration generator 160 and the lamp 170 are connected to the circuit board so that a vibration and light are generated.

In addition, the main control module 210 according to the present invention interworks with the mode control module 220 described below, so as to control an operation mode of the terminal in response to a signal received from the mode control module 220.

The mode control module 220 outputs a signal for switching the mode of the terminal in response to an input external force. Here, the mode of the terminal may be a wake-up mode in which the display module 120, which is in a sleep mode state in which the display module 120 is turned off so as not to display characters, numbers, images, etc. on the display module 120, is turned on so as to display characters, numbers, images, etc. on the display module 120, a sleep mode in which the display module 120, which is in the wake-up mode in which the display module 120 is turned on, is switched to an off mode, a screen switching mode in which, when various functions of the terminal are activated in the form of a screen, a popup window, or an icon so as to be performed in the wake-up mode of the terminal, a screen, a popup window, or an icon for another inactivated function is switched, or a signal reception switching mode in which a reception signal of the terminal, such as a call or a message, is changed into a mode of a vibration, a sound, a lamp, or the like. The type of mode switching is not limited to the above-mentioned examples, and thus may be variously applied between other functions included in the terminal.

The screen switching mode may represent, for example, a mode in which, when a screen, a popup window, or an icon for playing music is currently displayed on the display module 120, the screen, popup window, or icon is switched to a screen, a popup window, or an icon for performing another function of the terminal, i.e., a function of the camera 140. The screen switching mode is not limited to the above example, i.e., the switching between a music playback mode and a camera mode, and thus may be used to switch between other various functions of the terminal.

Furthermore, the screen switching mode may represent a mode in which, when one of various functions of the terminal is being performed, the screen is switched to a popup window including a plurality of icons for performing main functions of the terminal or functions set by the user. Here, when the screen is switched to the popup window, by touching an icon to be executed, a function for the icon may be performed.

The mode control module 220 for outputting a mode switching signal of the terminal as described above includes: the receiver sensor 221 which is installed in the case 110 to correspond to the window, and inter-converts an electric signal and an external physical force to transfer a call connection sound and a voice of a user's other party to the user in response to an input call signal and generate the mode switching signal of the terminal; and a signal processing unit 222 which analyzes a magnitude of a voltage generated in the receiver sensor 221, the number of times voltage is generated, and a time interval between generation of a plurality of voltages to determine the type of the external force and switch an execution mode of the terminal. Here, the receiver sensor 221 is covered by the window so as not to be exposed to the outside.

The receiver sensor 221 according to an embodiment of the present invention is a piezoelectric bone conduction receiver, and includes, as illustrated in FIG. 3, first and second piezoelectric layers 221*a* and 221*b* vertically stacked, a first circumferential electrode 221*c* formed on a part of an upper surface of the first piezoelectric layer 221*a*, a second circumferential electrode 221*d* formed on a part of a lower surface of the second piezoelectric layer 221*b*, an inner electrode 221*e* formed between the first piezoelectric 221*a* and the second piezoelectric layer 221*b*, a first cross-sectional electrode 221*f* formed on one side surface of each of the first and second piezoelectric layers 221*a* and 221*b*, a second cross-sectional electrode 221*g* formed on another side surface of each of the first and second piezoelectric layers 221*a* and 221*b* so as to oppose the first cross-sectional electrode 221*f*, a first auxiliary electrode 221*h*, one end of which is connected to one end of the second cross-sectional electrode 221*g* and the other end of which is spaced apart from the first circumferential electrode 221*c* on the upper surface of the first piezoelectric layer 221*a*, and a second auxiliary electrode 221*i*, one end of which is connected to the other end of the second cross-sectional electrode 221*g* and the other end of which is spaced apart from the second circumferential electrode 221*d*. According to the receiver sensor 221 according to this embodiment, one end of the first circumferential electrode 221*c* is connected to the first cross-sectional electrode 221*f*, the other end of the first circumferential electrode 221*c* is spaced apart from the first auxiliary electrode 221*h*, one end of the second circumferential electrode 221*d* is connected to the first cross-sectional electrode 221*f*, and the other end of the second circumferential electrode 221*d* is spaced apart from the second auxiliary electrode 221*g*. Furthermore, the inner electrode 221*e* is connected to any one of the first and second cross-sectional electrodes 221*f* and 221*g*, for example, the second cross-sectional electrode 221*g*, and is spaced apart from the first cross-sectional electrode 221*f*.

Furthermore, as described above, the receiver sensor 221 acts as both a speaker for transferring a call connection sound and a voice of a user's other party to the user in response to an input call signal and a signal generation means for generating a signal for controlling the mode of the terminal. That is, the receiver sensor 221 acts as a speaker for transferring, to user's ears, a call connection sound and a call voice of a user's other part received from the main control module 210 and a mode switching signal generator for transferring, to the signal processing unit 222, voltage data generated by an input external force so that the voltage data may be used to control the mode of the terminal.

To this end, first and second power lines 224*a* and 224*b* are provided to connect the main control module 210 and the receiver sensor 221, wherein one end of the first power line 224*a* is connected to the first circumferential electrode 221*c*, and one end of the second power line 224*b* is connected to the second cross-sectional electrode 221*g*. Accordingly, electric signals output from the mobile communication unit and the main control module 210 are connected to the first circumferential electrode 221*c* and the second cross-sectional electrode 221*g* via the first and second power lines 224*a* and 224*b*, and, accordingly, a vibration is generated due to contraction and expansion of the first and second piezoelectric layers 221*a* and 221*b*, so that a call connection sound and a call voice of a user's other party are transferred to the user's ears.

Furthermore, third and fourth power lines 223*a* and 223*b* are provided to connect the main control module 220 and the receiver sensor, wherein one end of the third power line 223a is connected to the first circumferential electrode 221c, and one end of the fourth power line 223b is connected to the second cross-sectional electrode 221g.

When an external force is applied to the receiver sensor 221, electric signals, i.e., voltages, are respectively generated in the first and second piezoelectric layers 221a and 221b, and these voltage values are transferred to the mode control module 220 by the third and fourth power lines 223a and 223b.

The electric signals, i.e., voltages, generated from the receiver sensor 221 are moved via the third and fourth power lines 223a and 223b as described above, and are transferred to the mode control module 220 described below so as to be used to control the mode of the terminal.

The external force described above is a force applied to a location on the window at which the receiver sensor 221 is installed, i.e., at least a certain level of user's force of touching or pressing the location on the window at which the receiver sensor 221 is installed. The user's touching or applying an external force to the receiver sensor 221 may be referred to as a "knock". The type of the knock may be variously modified into knocking one time, knocking two times or more times, etc. Furthermore, when the knock is performed multiple times, i.e., at least two times, the type of the knock may be variously modified in terms of a time interval between the multiple knocks.

The signal processing unit 222 includes: a data collecting unit 222a which collects voltage data generated in the receiver sensor 221 by an applied external force or knock; a mode switching determination unit 222b which compares the voltage data provided from the data collecting unit 222a with a reference value to determine whether a signal for switching a mode has been input to the receiver sensor 221 or an external force not intended by the user has occurred; and a mode switching control unit 222c which, when it is determined that an external force generated by a knock applied or input to the receiver sensor 221 is a signal input by the user to switch a mode, determines a mode switching type according to the type of detected voltage data, and transfers the signal for switching a mode to the main control module 210.

The data collecting unit 222a receives and stores in real time the voltage data generated in the receiver sensor 221. That is, the data collecting unit 222a collects and stores voltage values generated since application of an external force to the receiver sensor 221 until release of the external force.

The mode switching determination unit 222b compares a stored reference value with the voltage data provided from the data collecting unit 222a to determine whether the detected voltage data satisfies the reference value so as to determine whether the external force applied to the receiver sensor 221 is a signal input intentionally by the user to switch a user. Here, a first reference value and a second reference value are included, and each of the first and second reference values is a voltage value. The first and second reference values are described in detail below.

Meanwhile, when the user or another object grazes or touches (or contacts) the receiver sensor, a slight external force may be transferred to the receiver sensor 221. However, when the user or an external object unintentionally grazes or contacts the receiver sensor 221, it is not easy to control the terminal if the display module 120 is woken up or switching to a screen, a popup window, or an icon for performing another function occurs in a wake-up state.

Therefore, to prevent mode switching of the terminal when a slight external force is unintentionally applied to the receiver sensor 221, it is required to set a minimum voltage value for switching a mode, and a voltage value required to be generated at least to switch a mode is a reference value (hereinafter referred to as the first reference value), and this value is stored in the mode switching determination unit 222b. Here, a voltage value to be compared with the first reference value, amongst detected voltage values, may be, for example, a maximum voltage value. An embodiment of the present invention is not limited thereto, and thus an average voltage value of the detected voltage values may be compared with the first reference value, wherein the first reference value is a voltage average value which is a reference to be compared with the average voltage value.

However, on the contrary, although the user does not intend mode switching of the terminal, the terminal may fall or may be dropped due to a mistake by the user or external factors, and, at this moment, an external force caused by a severe shock may be applied to the receiver sensor 221. Accordingly, in the present invention, when a strong external force is applied to the receiver sensor as described above, it is not determined that the user has knocked on the receiver sensor 221 to switch a mode. Furthermore, in particular, when the user drops the terminal on the ground while using the terminal in a wake-up state, activated functions (e.g., financial or scheduling program, or the like) of the terminal may be still displayed on the display module 120 in an activated state. In the case, there occurs a risk of exposing information displayed on the display unit of the terminal to a person other than the user. Therefore, to switch the terminal to a security mode when a strong external force is unintentionally applied to the receiver sensor during the wake-up mode of the terminal without switching the terminal to the wake-up mode when a strong external force is unintentionally applied to the receiver sensor during the sleep mode of the terminal, it is required to set the second reference value which is a higher reference voltage value than the first reference value, and the second reference value is stored in the mode switching determination unit 222b. Here, a voltage value to be compared with the second reference value, amongst detected voltage values, may be, for example, a maximum voltage value. An embodiment of the present invention is not limited thereto, and thus an average voltage value of the detected voltage values may be compared with the second reference value, wherein the second reference value is a voltage average value which is a reference to be compared with the average voltage value.

As described above, in the present invention, when the user drops the terminal or a strong external force occurs due to other external factors while the terminal is in the sleep mode, the sleep mode is maintained without switching the mode of the terminal if a voltage value generated in the receiver sensor 221 is equal to or higher than the second reference value. Furthermore, when the user drops the terminal or a strong external force occurs due to other external factors while the terminal is in the wake-up mode, the terminal is switched to the security mode if a voltage value generated in the receiver sensor 221 is equal to or higher than the second reference value. Herein, switching the terminal from the wake-up mode to the security mode may be any one of displaying a popup window showing a message of security, warning, caution, or the like in the state of the wake-up mode, displaying a popup window showing a query about execution, and directly switching to the sleep mode by turning off the display module. Therefore, even if the user drops the terminal, the terminal may be protected so as to prevent a person other than the user from seeing information of the terminal.

When the mode switching determination unit 222b determines that an external force applied to the receiver sensor 221 is a signal intentionally input by the user to switch a mode, the mode switching control unit 222c analyzes the number of times a voltage peak occurs and a time interval between occurrences of the voltage peak to determine the type of a mode to which the terminal is to be switched according to a current mode of the terminal, and transfers a signal for switching to the mode to the main control module.

When the user knocks on the receiver sensor 221, a level of a voltage generated changes according to a magnitude of the external force applied to the receiver sensor 221. A voltage value generated when the user knocks on the receiver sensor 221 at intervals of seconds or transiently (i.e., instantaneously) may be presented in a time sequence, for example, as illustrated in FIGS. 4 to 6. That is, the voltage value may increase as time elapses, and may decrease after exhibiting a maximum voltage value. This is because the external force applied by a user's hand to the receiver sensor 221 changes until the external force is completely released after the external force starts to be applied, exhibits a maximum force thereafter, and starts to be released thereafter.

Provided that a voltage peak is a voltage value at which an increase of the voltage value stops and the voltage value starts to decrease, when the application of the external force or knock to the receiver sensor 221 occurs one time, a single voltage peak appears within a certain period of time as illustrated in FIG. 4, or, when the application of the external force or knock to the receiver sensor 221 occurs two times, two voltage peaks appear as illustrated in FIG. 5. When the application of the knock occurs more than two times, the number of peaks which appear corresponds to the number of times the application occurs.

Furthermore, the mode switching control unit 222c of the present invention generates signals for switching to different modes according to the number of peaks generated in a current mode of the terminal. For example, when a single voltage peak is generated by an input external force in a state in which the terminal is currently in the sleep mode, the mode switching control unit 222c determines first mode switching among various types of mode switching, and transfers a signal for the first mode switching (hereinafter referred to as a first mode switching signal) to the main control module 210. For another example, when two voltage peaks are generated, the mode switching control unit 222c determines second mode switching different from the first mode switching, and, when three voltage peaks are generated, the mode switching control unit 222c determines third mode switching different from the first and second mode switching, and the mode switching control unit 222c transfers signals for the second and third mode switching (hereinafter referred to as second and third mode switching signals) to the main control module 210.

Furthermore, when a single voltage peak is generated by an input external force in a state in which the terminal is currently in the wake-up mode, the mode switching control unit 222c determines fourth mode switching among various types of mode switching, and transfers a signal for the fourth mode switching (hereinafter referred to as a fourth mode switching signal) to the main control module 210. For another example, when two voltage peaks are generated, the mode switching control unit 222c determines fifth mode switching different from the fourth mode switching, and transfers a signal for the fifth mode switching (hereinafter referred to as a fifth mode switching signal) to the main control module 210.

Here, in order for the terminal to differentiate the first mode switching signal, the second mode switching signal, and the third mode switching signal in the sleep mode, two or three voltage peaks are required to be generated within a certain time (hereinafter referred to as a reference time. That is, when a second voltage peak (second peak) is generated within a first reference time after a first voltage peak (first peak) is generated, the second mode switching signal is generated, and, when the second voltage peak and a third voltage peak (third peak) are generated within a second reference time after the first voltage peak is generated, the third mode switching signal is generated. On the contrary, when an elapse time between generation of the first voltage peak (first peak) and generation of the second voltage peak (second peak) exceeds the first reference time, the first mode switching signal is generated instead of generating the second mode switching signal. Furthermore, when an elapse time between generation of the first voltage peak (first peak) and generation of the third voltage peak (third peak) exceeds the second reference time, the third mode switching signal is not generated.

Likewise, in order for the terminal to differentiate the fourth mode switching signal and the fifth mode switching signal in the wake-up mode, two peaks are required to be generated within the first reference time. That is, when the second voltage peak (second peak) is further generated within the first reference time after the first voltage peak (first peak) is generated, it is determined that two voltage peaks have been successively generated, and the fifth mode switching signal is generated. On the contrary, when the second voltage peak (second peak) is further generated after elapse of the first reference time since generation of the first voltage peak (first peak), the fourth mode switching signal is generated instead of generating the fifth mode switching signal.

Here, the first reference time and the second reference time may be the same time, or the second reference time may be longer or shorter than the first reference time.

The first mode switching to the third mode switching are types of mode switching performed in the sleep mode.

The first mode switching may be, for example, switching the terminal from the sleep mode to the wake-up mode. That is, the first mode switching may be switching to the wake-up mode in which the display unit, which is in a turned-off state, is turned on to display a screen.

The second mode switching represents switching a signal reception mode of a call, a message, or a notification of the terminal to a mode of a sound, vibration, or lamp while maintaining the state of the sleep mode of the terminal. That is, when the second mode switching signal is generated in a state in which a signal reception mode is any one of a sound mode, a vibration mode, and a lamp mode, the signal reception mode is switched to another signal reception mode different from that of the current state among the sound mode, the vibration mode, and the lamp mode. For more specific example, if the second mode switching signal is transferred to the main control module when a current signal reception mode of the terminal is the sound mode, the sound mode is switched to the vibration mode, and, if the second mode switching signal is transferred to the main control module in the vibration mode, the vibration mode is switched to the lamp mode, and, if the second mode switching signal is transferred to the main control module in the lamp mode, the lamp mode is switched back to the sound mode.

The second mode switching is not limited to the above-mentioned signal reception mode switching, and thus may be switching to a mode for performing another additional function of the terminal, for example, switching to a camera mode or a music playback mode.

The third mode switching may be switching to an emergency call mode. That is, the third mode switching may be switching to a mode in which an emergency call is immediately performed, instead of displaying a screen for inputting a phone number by wakening up the display unit of the terminal, if the third mode switching signal is input in an emergency situation when the terminal is in the sleep mode.

Mode switching in the sleep mode is not limited to switching to three modes, and thus may be performed to switch to more than three modes. Furthermore, although the number of voltage peaks is limited to one to three in the above description, mode switching signals may be classified according to four or five voltage peaks. Furthermore, although the first to third mode switching signals are classified according to the number of voltage peaks in the above description, an embodiment of the present invention is not limited thereto, and thus the mode switching signals may be classified according to a time interval between occurrences of a voltage peak.

When the time interval between occurrences of the first voltage peak and the second voltage peak is within the first reference time, a mode switching signal may be classified as a sixth mode switching signal, and, when the time interval between occurrences of the first voltage peak and the second voltage peak exceeds the first reference time but is within the second reference time, a mode switching signal may be classified as a seventh mode switching signal. Furthermore, modes to which the terminal is to be switched in response to the sixth mode switching signal and the seventh mode switching signal may be modes for performing other additional functions of the terminal, for example, a camera mode and a music playback mode.

The fourth mode switching and the fifth mode switching are types of mode switching performed in the wake-up mode.

Here, the fourth mode switching represents, for example, switching a signal reception mode of a call, a message, or a notification of the terminal to a mode of a sound, vibration, or lamp in the wake-up mode of the terminal. That is, when the first mode switching signal is generated in a state in which a signal reception mode is any one of a sound mode, a vibration mode, and a lamp mode, the signal reception mode is switched to another signal reception mode different from that of the current state among the sound mode, the vibration mode, and the lamp mode. For more specific example, if the first mode switching signal is transferred to the main control module when a current signal reception mode of the terminal is the sound mode, the sound mode is switched to the vibration mode, and, if the first mode switching signal is transferred to the main control module in the vibration mode, the vibration mode is switched to the lamp mode, and, if the first mode switching signal is transferred to the main control module in the lamp mode, the lamp mode is switched back to the sound mode.

The second mode switching is not limited to the above-mentioned signal reception mode switching, and thus may be switching to a mode for performing another additional function of the terminal, for example, switching to a camera mode or a phone call mode.

The fifth mode switching may be screen mode switching for switching a screen of the terminal which is in the wake-up mode. That is, the fifth mode switching represents switching to a mode in which, when a program of one of various functions of the terminal is activated and a screen, a popup window, or an icon for executing the program is displayed in the display module in the wake-up mode of the terminal, a screen, a popup window, or an icon for executing another program is displayed on the display module. For more specific example, the fifth mode switching may be switching to a screen, a popup window, or an icon for performing another function of the terminal, i.e., a camera function, when a screen, a popup window, or an icon for playing music is currently displayed on the display module 120. The screen switching mode is not limited to the above example, i.e., the switching between a music playback mode and a camera mode, and thus may be used to switch between other various functions of the terminal.

Furthermore, the screen mode switching, which is the fifth mode switching, may represent switching the screen of the terminal, which is performing one of various functions of the terminal, to a popup window including a plurality of icons for performing main functions of the terminal or functions set by the user. Here, when the screen is switched to the popup window, by touching an icon to be executed, a function for the icon may be performed.

Mode switching in the wake-up mode is not limited to switching to two modes, and thus may be performed to switch to more than two modes. Furthermore, although the number of voltage peaks is limited to one and two in the above description, mode switching signals may be classified according to three or four voltage peaks. Furthermore, although the first and second switching signals are classified according to the number of voltage peaks in the above description, an embodiment of the present invention is not limited thereto, and thus the mode switching signals may be classified according to a time interval between occurrences of a voltage peak.

When the time interval between occurrences of the first voltage peak and the second voltage peak is within the first reference time, a mode switching signal may be classified as an eighth mode switching signal, and, when the time interval between occurrences of the first voltage peak and the second voltage peak exceeds the first reference time but is within the second reference time, a mode switching signal may be classified as a ninth mode switching signal. Furthermore, modes to which the terminal is to be switched in response to the eighth mode switching signal and the ninth mode switching signal may be modes for performing other additional functions of the terminal, for example, a camera mode and a music playback mode.

Hereinafter, a process of switching a mode of the terminal by using the control device 200 including the mode control module 220 according to an embodiment of the present invention will be described with reference to FIG. 7.

When an external force is applied to the receiver sensor 221 (S100), a voltage is generated in the receiver sensor 221, and the data collecting unit 222*a* collects and stores in real time voltage values generated in the receiver sensor 221 (S200).

Thereafter, the voltage values stored in the data collecting unit 222*a* are transferred to the mode switching determination unit 222*b*, and the mode switching determination unit 222*b* compares and determines whether a maximum voltage (hereinafter referred to as a maximum sensor voltage value) among the voltage values generated in the receiver sensor 221 falls within a range of from a first reference value to a second reference value (S300).

For example, when the mode switching determination unit 222*b* determines that the maximum sensor voltage value does not satisfy the range of from the first reference value to the second reference value, this case indicates that the maximum sensor voltage value is smaller than the first reference value or exceeds the second reference value. Therefore, when the mode switching determination unit 222b determines that the maximum sensor voltage value does not satisfy the range of from the first reference value to the second reference value, the mode switching determination unit 222b determines whether the maximum sensor voltage value is equal to or larger than the first reference value (S310). Here, when it is determined that the maximum sensor voltage value is smaller than the first reference value, the mode switching determination unit 222b determines that the user has not intentionally applied the external force to the receiver sensor 221 to switch the mode of the terminal, and thus does not generate a mode switching signal. In other words, when it is determined that the maximum sensor voltage value is smaller than the first reference value (No), the mode switching determination unit determines that a slight external force was unintentionally applied to the receiver sensor when the user or another object grazed or touched (or contacted) the receiver sensor, and thus does not generate a mode switching signal.

On the contrary, when it is determined that the maximum sensor voltage value exceeds the second reference value, the mode switching determination unit 222b determines that the user has not intentionally applied the external force to the receiver sensor 221 to switch the mode of the terminal. Here, when the terminal is currently in the wake-up mode, the mode switching control unit 222c generates a sleep switching mode signal (S320) and transfers the generated signal to the main control module. Here, when the terminal is currently in the sleep mode, the main control module maintains the sleep mode (S330), and, when the terminal is currently in the wake-up mode, the wake-up mode is switched to the sleep mode (S330).

For another example, when the mode switching determination unit 222b determines that the maximum sensor voltage value satisfies the range of from the first reference value to the second reference value (Yes), the mode switching determination unit 222b determines whether the terminal is currently in the sleep mode (S400) or in the wake-up mode (S400). This determination may be performed on the basis of data received from the main control module 210 which performs overall control.

For example, when it is determined that the terminal is currently in the sleep mode, the mode switching control unit analyzes voltage data provided from the data collecting unit 222a to detect the number of voltage peaks (S611, S612, S613). For example, when the number of voltage peaks indicating maximum voltage values is one as illustrated in FIG. 4 as a result of the voltage data analysis, the mode switching control unit generates the first mode switching signal (S612), and transfers the first mode switching signal to the main control module 210. The main control module performs the first mode switching corresponding to the first mode switching signal, i.e., switches the terminal to the wake-up mode (S613).

For another example, when two voltage peaks indicating maximum voltage values appear within a reference time as illustrated in FIG. 5 as a result of the voltage data analysis, the mode switching control unit 222c generates the second mode switching signal (S622), and transfers the second mode switching signal to the main control module 210. The main control module 210 performs the second mode switching corresponding to the second mode switching signal (S623). Here, the second mode switching represents switching a signal reception mode of a call, a message, or a notification of the terminal to a mode of a sound, vibration, or lamp. That is, when the signal reception mode of the terminal is currently the sound mode, if an external force corresponding to the second mode switching signal is applied to the receiver sensor 221, the main control module changes the signal reception mode of the terminal to the vibration mode in response to the second mode switching signal. Furthermore, when the signal reception mode of the terminal is the vibration mode, if an external force corresponding to the second mode switching signal is applied to the receiver sensor 221, the main control module changes the signal reception mode of the terminal to the lamp mode in response to the second mode switching signal.

For another example, when three voltage peaks indicating maximum voltage values appear within a reference time as illustrated in FIG. 6 as a result of the voltage data analysis, the mode switching control unit 222c generates the third mode switching signal (S632), and transfers the third mode switching signal to the main control module 210. The main control module 210 performs the third mode switching corresponding to the third mode switching signal (S633). Here, the third mode switching may be switching to a mode in which an emergency call is immediately performed upon receiving the third mode switching signal. This emergency mode switching is useful to make an emergency call without pressing a phone number after turning on the display unit in an emergency situation.

Meanwhile, when it is determined that the terminal is currently in the wake-up mode (S500), the mode switching control unit analyzes voltage data provided from the data collecting unit 222a to detect the number of voltage peaks (511, S512). For example, when the number of voltage peaks indicating maximum voltage values is one as illustrated in FIG. 4 as a result of the voltage data analysis, the mode switching control unit generates the fourth mode switching signal (S512), and transfers the fourth mode switching signal to the main control module 210. The main control module performs the fourth mode switching corresponding to the fourth mode switching signal (S513). The fourth mode switching represents, for example, switching a signal reception mode of a call, a message, or a notification of the terminal to a mode of a sound, vibration, or lamp. For more specific example, when the signal reception mode of the terminal is the sound mode, if an external force corresponding to the fourth mode switching signal is applied to the receiver sensor 221, the main control module changes the signal reception mode of the terminal to the vibration mode in response to the fourth mode switching signal. Furthermore, when the signal reception mode of the terminal is the vibration mode, if an external force corresponding to the first mode switching signal is applied to the receiver sensor 221, the main control module changes the signal reception mode of the terminal to the lamp mode in response to the first mode switching signal.

For another example, when two voltage peaks indicating maximum voltage values appear within a reference time as illustrated in FIG. 5 as a result of the voltage data analysis, the mode switching control unit 222c generates the fifth mode switching signal (S522), and transfers the fifth mode switching signal to the main control module 210. The main control module 210 performs the fifth mode switching corresponding to the fifth mode switching signal (S523). The fifth mode switching may represent screen mode switching for switching a screen, a popup window, or an icon of one running program to a screen, a popup window, or an icon of another program. For more specific example, when a screen, a popup window, or an icon for playing music is currently displayed on the display module, if an external force corresponding to the fifth mode switching signal is applied to the receiver sensor, the main control module switches the screen, popup window, or icon to a screen, a popup window, or an icon for performing another function of the terminal, i.e., a camera function, in response to the fifth mode switching signal.

As described above, the user may easily switch the mode of the terminal by performing a simple operation of applying an external force, i.e., a knock, to the window of the terminal. Furthermore, by using the receiver sensor 221 as a sensor for switching the mode of the terminal in response to an external force, the mode of the terminal may be switched more accurately in comparison with the prior art, and, when the user unintentionally applies an external force, the terminal may be prevented from switching the mode or maintaining a turned-on state of the display module, and thus incorrect operation of the terminal may be reduced and personal information of the user may be protected.

Moreover, in the present invention, the receiver sensor 221, which is installed in the terminal for a phone call, is directly used as a means for generating a signal for switching a mode, without additionally installing a sensor for switching a mode. Accordingly, it is not required to install an additional sensor for switching a mode.

INDUSTRIAL APPLICABILITY

According to the terminal control device and the control method using the same according to the present invention, a user may easily switch a mode of a terminal by performing a simple operation of applying an external force, i.e., a knock, to a window of the terminal. Furthermore, by using a receiver sensor as a sensor for switching the mode of the terminal in response to an external force, the mode of the terminal may be switched more accurately in comparison with the prior art. Moreover, when the user unintentionally applies an external force, the terminal may be prevented from switching the mode or maintaining a turned-on state of the display module, and thus incorrect operation of the terminal may be reduced and personal information of the user may be protected.

What is claimed is:

1. A terminal control device having a mode control module for switching an execution mode of a terminal, the terminal control device comprising:
a main control module configured to control driving of the terminal;
a receiver sensor installed in the terminal and capable of inter-conversion between an electric signal and an external physical force; and
a signal processing unit configured to analyze an electric signal generated in the receiver sensor, process the electric signal into a mode switching signal for switching a mode of the terminal, and transfer the mode switching signal to the main control module,
wherein the receiver sensor acts as a speaker for transferring a call connection sound and a voice of a user's other party to the user in response to an input electric signal.

2. The terminal control device of claim 1, wherein, in the receiver sensor, a generated voltage value changes according to a magnitude of an external force applied to the receiver sensor, voltages are generated by as many as the number of times the external force is applied, and a plurality of voltage peaks occur at a time interval corresponding to an interval between application times of the external force applied multiple times.

3. The terminal control device of claim 2, wherein the signal processing unit comprises:
a data collecting unit configured to collect a voltage value generated in the receiver sensor according to a time at which the external force is applied, and store the collected voltage value;
a mode switching determination unit configured to compare a reference value and a receiver sensor voltage value stored in the data collecting unit to determine whether the external force was intentionally input by a user to switch the mode of the terminal; and
a mode switching control unit configured to maintain a current mode of the terminal, or differently transfer, according to a type of a generated voltage, a mode switching signal to the main control module, according to a result of determination by the mode switching determination unit.

4. The terminal control device of claim 3, wherein the mode switching control unit analyzes voltage value generated from the receiver sensor to classify into any one of a plurality of mode switching signals for switching to different modes based on at least one of a voltage peak value, the number of voltage peaks, and an occurrence time interval between the voltage peaks, and generate a classified mode switching signal.

5. The terminal control device of claim 4,
wherein the reference value stored in the mode switching determination unit comprises a first reference value and a second reference value larger than the first reference value,
wherein, when the receiver sensor voltage value is equal to or larger than the first reference value and is equal to or smaller than the second reference value, the mode switching control unit switches the mode of the terminal to a mode different from a current mode,
wherein, when the receiver sensor voltage value is smaller than the first reference value, the mode switching control unit maintains a current mode state of the terminal,
wherein, when the receiver sensor voltage value exceeds the second reference value, the mode switching control unit switches the terminal to a security mode.

6. The terminal control device of claim 5, wherein the security mode is any one of displaying a popup window showing a security or warning message, displaying a popup window showing a query about execution, and switching to a sleep mode.

7. The terminal control device of claim 4, wherein the plurality of mode switching signals comprise mode switching signals respectively for switching the terminal from a sleep mode to a wake-up mode, signal reception mode switching for switching a signal reception type of the terminal to any one of a sound mode, a vibration mode, and a lamp mode, emergency call mode switching for performing an emergency call, camera mode switching for operating a camera installed in the terminal, and screen mode switching for switching screens for functions being executed and visually displayed on a display module of the terminal.

8. The terminal control device of claim 7,
wherein, when the mode switching control unit switches the terminal by classifying into any one of the plurality of mode switching signals and generating a classified mode switching signal according to the number of voltage peaks,
when the number of the voltage peaks is one in a state in which the terminal is in a sleep mode, the mode switching control unit generates a first mode switching signal so that first mode switching is performed in the terminal, when the number of the voltage peaks is two in the state in which the terminal is in the sleep mode, the mode switching control unit generates a second mode switching signal so that second mode switching is performed in the terminal, and when the number of the voltage peaks is three in the state in which the terminal is in the sleep mode, the mode switching control unit generates a third mode switching signal so that third mode switching is performed in the terminal, wherein each of a first mode of the first mode switching, a second mode of the second mode switching, and a third mode of the third mode switching is a mode in which any one of a plurality of functions of the terminal is operated, and the first mode, the second mode, and the third mode are different modes.

9. The terminal control device of claim 8, wherein each of the first to third mode switching is any one of switching to a wake-up mode, signal reception mode switching for switching a signal reception type of the terminal to any one of a sound mode, a vibration mode, and a lamp mode, and emergency call mode switching for performing an emergency call.

10. The terminal control device of claim 8,
wherein, when the mode switching control unit switches the terminal by classifying into any one of the plurality of mode switching signals and generating a classified mode switching signal according to the number of voltage peaks, when the number of the voltage peaks is one in a state in which the terminal is in a wake-up mode, the mode switching control unit generates a fourth mode switching signal so that fourth mode switching is performed in the terminal, and when the number of the voltage peaks is two in the state in which the terminal is in the wake-up mode, the mode switching control unit generates a fifth mode switching signal so that fifth mode switching is performed in the terminal, wherein each of a fourth mode of the fourth mode switching and a fifth mode of the fifth mode switching is a mode in which any one of a plurality of functions of the terminal is operated, and the fourth mode and the fifth mode are different modes.

11. The terminal control device of claim 10,
wherein, when classifying into any one of the plurality of mode switching signals according to the number of the voltage peaks, classification into any one of the plurality of mode switching signals is performed according to the number of voltage peaks generated within a reference time, wherein the reference time comprises a first reference time and a second reference time, and the first reference time and the second time are the same, or the second reference time is longer than or shorter than the first reference time, wherein the second mode switching signal and the fifth mode switching signal are generated when a second voltage peak occurs within a first reference time after occurrence of a first voltage peak, wherein the third mode switching signal is generated when the second voltage peak and a third voltage peak occur within a second reference time after the occurrence of the first voltage peak.

12. The terminal control device of claim 10, wherein each of the fourth mode switching and the fifth mode switching is either of signal reception mode switching for switching a signal reception type of the terminal to any one of a sound mode, a vibration mode, and a lamp mode and screen mode switching for switching screens for functions being executed and visually displayed on a display module of the terminal.

13. The terminal control device of claim 1, wherein the receiver sensor comprises a piezoelectric layer which is deformed by an external force input from the outside of the terminal so as to generate a voltage.

14. The terminal control device of claim 13, wherein the receiver sensor is a piezoelectric bone conduction receiver comprising a piezoelectric layer capable of inter-conversion between an electric signal and an external physical force.

15. The terminal control device of claim 7,
wherein the display module of the terminal comprises a display unit having a visual display effect and a window installed to cover the display unit, wherein the receiver sensor has a smaller area in comparison with the display module and the window so as to be correspondingly positioned at a back of the window.

16. A terminal control method for switching an execution mode of a terminal, the terminal control method comprising:
determining whether a signal for switching a terminal mode is applied to a receiver sensor installed in the terminal and capable of inter-conversion between an electric signal and an external physical force; and switching the terminal to a mode different from a currently running mode of the terminal or maintaining the currently running mode by using voltage value generated in response to an external force applied to the receiver sensor, wherein the receiver sensor acts as a speaker for transferring a call connection sound and a voice of a user's other party to the user in response to an input electric signal.

17. The terminal control method of claim 16, wherein, in the receiver sensor, a generated voltage value changes according to a magnitude of an external force applied to the receiver sensor, voltages are generated by as many as the number of times the external force is applied, and a plurality of voltage peaks occur at a time interval corresponding to an interval between application times of the external force applied multiple times.

18. The terminal control method of claim 17, wherein voltage value generated from the receiver sensor is analyzed to classify into any one of a plurality of mode switching signals for switching to different modes based on at least one of a voltage peak value, the number of voltage peaks, and an occurrence time interval between the voltage peaks, and generate a classified mode switching signal.

19. The terminal control method of claim 18, wherein the determining whether the signal for switching the terminal mode is applied to the receiver sensor comprises:
setting a first reference value having a first voltage value and a second reference value having a larger voltage value than that of the first reference value;

detecting a voltage value generated from the receiver sensor;

determining that the signal for switching the terminal mode is applied to the receiver sensor, when the detected voltage value of the receiver sensor satisfies a range of from the first reference value to the second reference value;

maintaining the terminal in a current mode state when the voltage value of the receiver sensor is smaller than the first reference value in a state in which the terminal is currently in a sleep model; and switching the terminal to a security mode when the voltage value of the receiver sensor exceeds the second reference value.

20. The terminal control method of claim 19, wherein the security mode is any one of displaying, on a display unit of the terminal, a popup window showing a security or warning message, displaying a popup window showing a query about execution, and switching to a sleep mode.

21. The terminal control method of claim 18, wherein the plurality of mode switching signals comprise mode switching signals respectively for switching the terminal from a sleep mode to a wake-up mode, signal reception mode switching for switching a signal reception type of the terminal to any one of a sound mode, a vibration mode, and a lamp mode, emergency call mode switching for performing an emergency call, camera mode switching for operating a camera installed in the terminal, and screen mode switching for switching screens for functions being executed and visually displayed on a display module of the terminal.

22. The terminal control method of claim 19, wherein the determining that the signal for switching the terminal mode is applied to the receiver sensor, when the voltage value of the receiver sensor satisfies the range of from the first reference value to the second reference value, comprises:

determining whether the terminal is in a sleep mode or a wake-up mode;

analyzing the voltage value generated in the receiver sensor to detect the number of voltage peaks that have occurred; and switching the terminal of the sleep mode or the wake-up mode to a mode different from a current mode, by generating mode switching signals for switching to different modes according to the number of the voltage peaks.

23. The terminal control method of claim 22,
wherein, to detect the number of the voltage peaks, it is determined whether, after a first voltage peak, a next voltage peak occurs within a reference time,
wherein, when the next voltage peak occurs within the reference time after the first voltage peak, a mode switching signal for switching to a mode different from that for occurrence of only the first voltage peak is generated so as to switch the terminal to a corresponding mode.

24. The terminal control method of claim 23,
wherein, when switching the terminal by classifying into any one of the plurality of mode switching signals and generating a classified mode switching signal according to the number of the voltage peaks,
when the number of the voltage peaks is one in a state in which the terminal is in a sleep mode, a first mode switching signal is generated so that first mode switching is performed in the terminal,
when the number of the voltage peaks is two in the state in which the terminal is in the sleep mode, a second mode switching signal is generated so that second mode switching is performed in the terminal, and
when the number of the voltage peaks is three in the state in which the terminal is in the sleep mode, a third mode switching signal is generated so that third mode switching is performed in the terminal,
wherein each of a first mode of the first mode switching, a second mode of the second mode switching, and a third mode of the third mode switching is a mode in which any one of a plurality of functions of the terminal is operated, and
the first mode, the second mode, and the third mode are different modes.

25. The terminal control method of claim 24, wherein each of the first to third mode switching is any one of switching to a wake-up mode, signal reception mode switching for switching a signal reception type of the terminal to any one of a sound mode, a vibration mode, and a lamp mode, and emergency call mode switching for performing an emergency call.

26. The terminal control method of claim 24,
wherein, when switching the terminal by classifying into any one of the plurality of mode switching signals and generating a classified mode switching signal according to the number of the voltage peaks,
when the number of the voltage peaks is one in a state in which the terminal is in a wake-up mode, a fourth mode switching signal is generated so that fourth mode switching is performed in the terminal, and
when the number of the voltage peaks is two, a fifth mode switching signal is generated so that fifth mode switching is performed in the terminal,
wherein each of a fourth mode of the fourth mode switching and a fifth mode of the fifth mode switching is a mode in which any one of a plurality of functions of the terminal is operated, and
the fourth mode and the fifth mode are different modes.

27. The terminal control method of claim 26,
wherein, when classifying into any one of the plurality of mode switching signals according to the number of the voltage peaks,
classification into any one of the plurality of mode switching signals is performed according to the number of voltage peaks generated within a reference time,
wherein the reference time comprises a first reference time and a second reference time, and the first reference time and the second reference time are the same, or the second reference time is longer than or shorter than the first reference time,
wherein the second mode switching signal and the fifth mode switching signal are generated when a second voltage peak occurs within a first reference time after occurrence of a first voltage peak,
wherein the third mode switching signal is generated when the second voltage peak and a third voltage peak occur within a second reference time after the occurrence of the first voltage peak.

28. The terminal control method of claim 26, wherein each of the fourth mode switching and the fifth mode switching is either of signal reception mode switching for switching a signal reception type of the terminal to any one of a sound mode, a vibration mode, and a lamp mode and screen mode switching for switching screens for functions being executed and visually displayed on a display module of the terminal.

* * * * *